US012770941B2

(12) United States Patent
Guo et al.

(10) Patent No.: US 12,770,941 B2
(45) Date of Patent: Oct. 20, 2026

(54) TEST MECHANISM, BATTERY TEST SYSTEM, AND BATTERY PRODUCTION SYSTEM

(71) Applicant: CONTEMPORARY AMPEREX TECHNOLOGY CO., LIMITED, Ningde (CN)

(72) Inventors: Lixin Guo, Ningde (CN); Bo Liu, Ningde (CN); Yankun Li, Ningde (CN); Keyu Ruan, Ningde (CN); Shaoteng Ren, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/297,732

(22) Filed: Aug. 12, 2025

(65) Prior Publication Data

US 2025/0364613 A1 Nov. 27, 2025

Related U.S. Application Data

(63) Continuation of application No. PCT/CN2023/134228, filed on Nov. 27, 2023.

(30) Foreign Application Priority Data

Apr. 17, 2023 (CN) ......................... 202310409802.7

(51) Int. Cl.
*H01M 10/00* (2006.01)
*H01M 10/42* (2006.01)
*H01M 50/569* (2021.01)

(52) U.S. Cl.
CPC ..... *H01M 10/4285* (2013.01); *H01M 50/569* (2021.01); *H01M 10/4207* (2013.01)

(58) Field of Classification Search
CPC ... Y02E 60/10; H01M 10/4285; H01M 10/04; H01M 10/4207; H01M 50/569
See application file for complete search history.

(56) References Cited

U.S. PATENT DOCUMENTS 8,231,417 B2 7/2012 Zhu

FOREIGN PATENT DOCUMENTS

CN 101369649 A 2/2009
CN 201323361 Y 10/2009
CN 101861664 A 10/2010
(Continued)

OTHER PUBLICATIONS

Chen, Short Circuit Testing Lithium of Battery, Feb. 2023, See the Abstract. (Year: 2023).*
(Continued)

*Primary Examiner* — Tiffany Legette
*Assistant Examiner* — Monique M Wills
(74) *Attorney, Agent, or Firm* — ANOVA LAW GROUP, PLLC

(57) ABSTRACT

A test mechanism includes a base, a limiting member disposed on the base, and a conductive member disposed on the base and spaced apart from the limiting member. A space between the conductive member and the limiting member is used for placing a unit under test, the limiting member is configured to abut against the unit under test, and the conductive member is configured to elastically abut against a test terminal of the unit under test.

19 Claims, 4 Drawing Sheets

(56) References Cited

FOREIGN PATENT DOCUMENTS

| | | | | | |
|---|---|---|---|---|---|
| CN | 102792526 | A | | 11/2012 | |
| CN | 203950624 | U | * | 11/2014 | |
| CN | 109030908 | A | * | 12/2018 | ......... G01R 19/0084 |
| CN | 208820002 | U | | 5/2019 | |
| CN | 212321669 | U | | 1/2021 | |
| CN | 216696589 | U | | 6/2022 | |
| CN | 218036928 | U | | 12/2022 | |
| CN | 218512589 | U | * | 2/2023 | |
| TW | 545778 | U | | 8/2003 | |
| WO | 2021198259 | A1 | | 10/2021 | |

OTHER PUBLICATIONS

Wu, A Lithium Polymer Battery Testing Machine, Dec. 2018, See the Abstract. (Year: 2018).*

Yao et al., A New Type Multi-way Adjustable Resistor Load Box, Nov. 2014, See the Abstract. (Year: 2014).*

The World Intellectual Property Organization (WIPO) International Search Report for PCT/CN2023/134228 Mar. 1, 2024 7 Pages (including translation).

The European Patent Office (EPO) The Extended European Search Report for Application No. 23933843.7 Jun. 30, 2026. 27 Pages.

* cited by examiner

TEST MECHANISM, BATTERY TEST SYSTEM, AND BATTERY PRODUCTION SYSTEM

CROSS-REFERENCE TO RELATED APPLICATIONS

The present application is a continuation of International Application No. PCT/CN2023/134228, filed on Nov. 27, 2023, which claims priority to Chinese Patent Application No. 202310409802.7 entitled "TEST MECHANISM, BATTERY TEST SYSTEM, AND BATTERY PRODUCTION SYSTEM" filed on Apr. 17, 2023, which are incorporated herein by reference in their entirety.

TECHNICAL FIELD

The present application relates to the technical field of battery testing, and in particular, to a test mechanism, a battery test system, and a battery production system.

BACKGROUND

Power batteries need to be tested in the production process. For example, batteries are subjected to voltage acquisition tests, temperature acquisition tests, pressure acquisition tests, or the like, to ensure that the products meet production requirements. In a test process, a cylinder is generally used to drive a positive electrode connecting assembly and a negative electrode connecting assembly to move close to each other, so as to achieve the connection to a battery. However, due to design defects of a conventional connecting structure, the automatic connection becomes complex, the test efficiency is low, and the test cost is high.

SUMMARY

Based on this, it is needed to provide a test mechanism, a battery test system, and a battery production system to achieve a quick and automatic connection, thereby improving the test efficiency; meanwhile, the structure is simple, facilitating a reduction of the test cost.

In a first aspect, the present application provides a test mechanism. The test mechanism includes: a base; a limiting member disposed on the base; and a conductive member disposed on the base and spaced apart from the limiting member, wherein a space between the conductive member and the limiting member is used for placing a unit under test, the limiting member is configured to abut against the unit under test, and the conductive member is configured to elastically abut against a test terminal of the unit under test.

According to the test mechanism described above, the limiting member and the conductive member are spaced apart on the base, so that an elastic connecting channel can be formed between the limiting member and the conductive member. When the unit under test needs to be connected for testing, the unit under test may be placed in the channel between the limiting member and the conductive member. At this time, the conductive member elastically abuts against the test terminal of the unit under test, to drive the unit under test to abut against the limiting member for limiting. In this way, the unit under test is stably clamped between the limiting member and the conductive member, so that a good electrical connection can be maintained between the test terminal of the unit under test and the conductive member. As such, the quick and automatic connection of the unit under test is achieved, thereby improving the test efficiency.

Meanwhile, compared with a conventional connecting structure, the test mechanism has a simple structure, a low periodic failure rate, and a low maintenance cost, which facilitates reducing the test cost.

In some embodiments, the conductive member includes a first component disposed on the base and a second component configured to abut against the test terminal of the unit under test, where the second component is connected to an end of the first component, and a gap that allows relative elastic deformation of the second component and the first component is formed therebetween. This design enables the second component to better elastically deform relative to the first component, so that the test terminal of the unit under test tightly abuts against the conductive member, thereby improving the reliability of the test connection.

In some embodiments, the first component and the second component are disposed at an included angle, and the included angle between the two components when no elastic deformation occurs is denoted as $\theta$, where $15° \leq \theta \leq 45°$. As such, the included angle $\theta$ between the first component and the second component is controlled to be between 15° and 45°, so that the conductive member occupies less space in the base for mounting the unit under test under the premise of having sufficient elasticity, thereby effectively taking both the elastic abutting capability and the space utilization into account.

In some embodiments, the included angle $\theta$ further satisfies the following condition: $35° \leq \theta \leq 40°$. As such, the included angle $\theta$ is properly optimized to be between 35° and 40°, so that the conductive member can better elastically abut against the unit under test, thereby enabling a more stable connection between the conductive member and the test terminal of the unit under test, and in turn improving the reliability of the test connection.

In some embodiments, the conductive member further includes a connecting part. The second component is connected to the end of the first component through the connecting part, and the connecting part is provided in an arching manner in a direction facing away from the gap. As such, the arched connecting part being disposed between the first component and the second component not only facilitates the arrangement of the first component and the second component at an included angle to improve the elastic function between the two components, but also reduces the stress concentration between the two components to improve the stability of the structure.

In some embodiments, the second component includes an extending part and a contact part. One end of the extending part is connected to the first component; the other end of the extending part is free to extend, and the gap is formed between the other end of the extending part and the first component. The contact part is disposed at an end of the extending part distal to the first component and is configured to abut against the test terminal of the unit under test. As such, the second component being designed to include the extending part and the contact part enables the extending part to bend and deform relative to the first component while the contact part is in electrical contact with the test terminal of the unit under test, thereby enabling a tighter connection between the contact part and the test terminal.

In some embodiments, the contact part is configured as a curved structure, and a convex surface of the contact part is provided in a protruding manner along a side facing away from the gap. As such, the contact part is designed to be curved, so that the convex surface of the contact part can keep good contact with the test terminal of the unit under test. Meanwhile, for the units under test of different types or dimensions, the contact part can also maintain a good electrical connection to the test terminal of the unit under test, thereby improving the stability of the test connection.

In some embodiments, the second component further includes a scratch-resistant part. The scratch-resistant part is disposed at an end of the contact part distal to the extending part, and the scratch-resistant part extends along a side facing the first component relative to the extending part. As such, the scratch-resistant part extending along the side facing the first component being disposed at the end of the contact part distal to the extending part enables the end of the contact part to be provided with a guide structure, reducing the probability that the unit under test is scratched when the unit under test is removed or placed in, thereby enabling the unit under test to be smoothly removed and placed.

In some embodiments, the scratch-resistant part and the extending part are disposed at an angle, and the angle between the two is denoted as β, where $100° \leq \beta \leq 150°$. This design enables the angle β to be controlled to be between 100° and 150°, so that not only a sufficient deformation space exists between the extending part and the first component, but also the scratch-resistant part can be properly bent into the gap, thereby achieving an effective scratch-resistant effect.

In some embodiments, the angle β further satisfies the following condition: $100° \leq \beta \leq 110°$. As such, the angle β is further controlled to be between 100° and 110°, so that the scratch-resistant performance and elastic function of the conductive member can be considered more effectively, thereby making the test of the unit under test more stable and reliable.

In some embodiments, an end of the scratch-resistant part distal to the contact part is bent in an arcing manner along a side facing the gap to form an arc-shaped part. As such, the end of the scratch-resistant part being bent in an arcing manner to form the arc-shaped part enables the impact of the scratch-resistant part on the first component or the base to be effectively weakened, the pressure loss to the first component or the base to be reduced, and the stability of the structure of the conductive member to be improved.

In some embodiments, the test mechanism further includes a mounting base disposed on the base. The conductive member is disposed on a side surface of the mounting base facing the limiting member. As such, the use of the mounting base facilitates the mounting of the conductive member on the base, and meanwhile, facilitates the electrical contact between the conductive member and the test terminal of the unit under test, thereby achieving an automatic test connection.

In some embodiments, at least one of a position of the conductive member on the mounting base and a position of the mounting base on the base is adjustable. As such, the position of the conductive member or the position of the mounting base being designed to be adjustable enables the conductive member to adapt to the units under test of different models or dimensions, thereby improving the application scope of the test mechanism.

In some embodiments, at least one end of the base in a preset direction is provided with a guiding member. The guiding member is configured to guide the unit under test onto the base, where a spacing direction between the conductive member and the limiting member intersects with the preset direction. As such, the guiding member being disposed on the at least one end of the base in the preset direction enables the unit under test to be effectively guided onto the base, thereby improving the placement precision of the unit under test on the base, and thus improving the reliability of the test.

In some embodiments, an end of the guiding member distal to the base is provided with a guiding surface, and the guiding surface is inclined in the preset direction and toward a side outside the base. As such, the guiding surface being disposed on the guiding member facilitates the placement of the unit under test on the base; meanwhile, the use of the inclined guiding surface enables the unit under test to be accurately placed on the base, thereby improving the placement precision of the unit under test.

In a second aspect, the present application provides a battery test system. The battery test system includes: the test mechanism according to any one of the above aspects; and an acquisition module electrically connected to the conductive member to obtain an operating parameter of the unit under test. As such, the use of the test mechanism described above enables a quick and automatic connection of the unit under test, thereby improving the test efficiency. Meanwhile, compared with a conventional connecting structure, the test mechanism has a simple structure, a low periodic failure rate, and a low maintenance cost, which facilitates reducing the test cost.

In some embodiments, the battery test system further includes a frame. The test mechanism and the acquisition module are both disposed in the frame. As such, the test mechanism and the acquisition module both being integrated in the frame enables a compact structural arrangement of the battery test system, reducing the space occupied by the device.

In some embodiments, the battery test system further includes a separator. The separator is disposed in the frame and separates the frame into at least two chambers, and at least one test mechanism is disposed in each of the chambers. As such, the separator separating the interior of the frame enables the frame to accommodate a plurality of test mechanisms, so that a plurality of units under test can be tested at the same time, thereby improving the test efficiency.

In a third aspect, the present application provides a battery production system. The battery production system includes the battery test system according to any one of the above aspects.

BRIEF DESCRIPTION OF THE DRAWINGS

To more clearly illustrate the technical solutions in embodiments of the present application, the drawings required for illustrating the embodiments of the present application are briefly described below. Apparently, the drawings in the following description illustrate merely some embodiments of the present application, and those of ordinary skills in the art may still derive other drawings from these drawings without creative efforts. In the drawings.

REFERENCE NUMERALS

Figure 1:
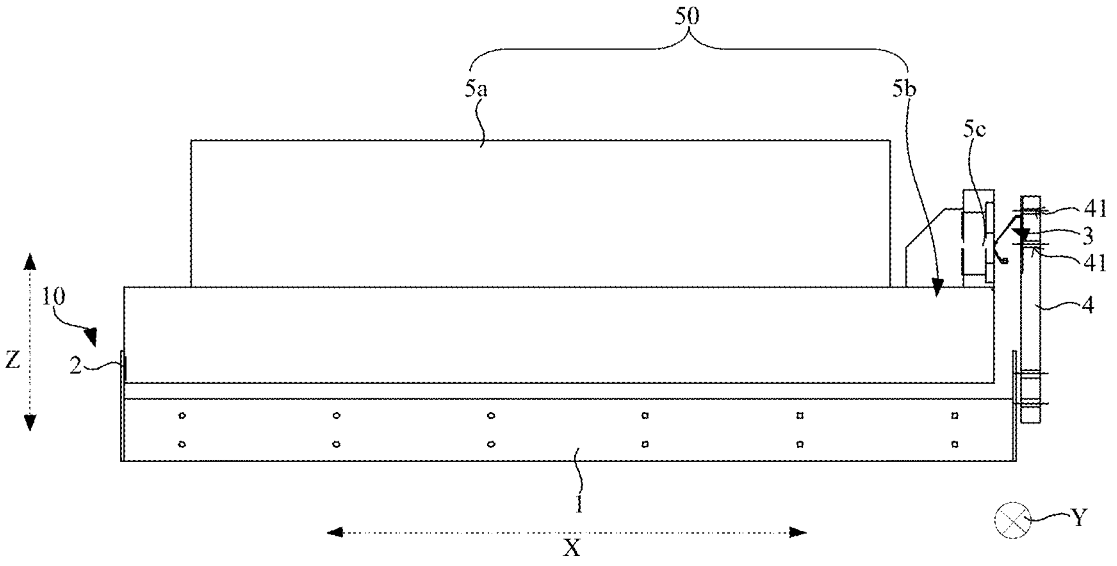
FIG. 1 is a schematic diagram illustrating the cooperation between a test mechanism and a unit under test according to one or more embodiments.

100: battery test system; 10: test mechanism; 1: base; 2: limiting member; 3: conductive member; 31: first component; 32: second component; 33: connecting part; 331: inner side surface; 332: outer side surface; 3*a*: extending part; 3*b*: contact part; 3*b*1: convex surface; 3*c*: scratch-resistant part; 3*d*: arc-shaped part; 34: gap; 35: second mounting hole; 4: mounting base; 41: first mounting hole; 5: guiding member; 51: guiding surface; X: spacing direction; Y: preset direction; Z: height direction; 20: acquisition module; 30: frame; 40: separator; 41: chamber; 50: unit under test; 5*a*: battery; 5*b*: carrier; and 5*c*: test terminal.

DETAILED DESCRIPTION

To make the aforementioned objects, features, and advantages of the present application more clear and comprehensible, specific embodiments of the present application will be described in detail in conjunction with the drawings below. In the following description, numerous specific details are set forth in order to provide a thorough understanding of the present application. However, the present application can be implemented in many other ways different from those described herein, and similar improvements can be made by those skilled in the art without departing from the spirit of the present application, such that the present application is not limited to the specific embodiments disclosed below.

In the description of the present application, it should be understood that if there are the technical terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", and the like, the directional or positional relationships indicated by the terms are based on the directional or positional relationships shown in the drawings. They are merely for the convenience of describing the present application and simplifying the description, and are not intended to indicate or imply that the apparatuses or elements referred to must have specific directions or must be constructed and operated in specific directions. Therefore, these terms should not be construed as limitations on the present application.

In addition, if there are the terms "first" and "second", the terms are used for descriptive purposes only and are not to be construed as indicating or implying relative importance or to implicitly indicate the number of technical features indicated. Thus, a feature defined by "first" or "second" may explicitly or implicitly show that at least one such feature is included. In the description of the present application, if there is the term "a plurality of", unless otherwise explicitly limited, the term "a plurality of" means at least two, for example, two, three, and the like.

In the present application, unless otherwise explicitly specified or limited, if there are the terms "mount", "link" "connect", "fix", and the like, the terms should be construed in a broad sense. For example, unless otherwise explicitly limited, they may be a fixed connection, a detachable connection, or an integral connection; a mechanical connection or an electrical connection; or a direct connection, an indirect connection through an intermediate, internal communication between two elements, or interaction between two elements. For those of ordinary skill in the art, the specific meanings of the aforementioned terms in the present application can be understood according to specific conditions.

In the present application, unless otherwise explicitly specified or limited, if there is a description that a first feature is "above" or "below" a second feature and other similar descriptions, the meanings thereof may be that the first feature and the second feature are in direct contact, or that the first feature and the second feature are in indirect contact through an intermediate. Moreover, a first feature being "over", "above", and "on top of" a second feature may be that the first feature is right above or obliquely above the second feature, or simply mean that the first feature is at a higher horizontal level than the second feature. A first feature being "under", "below", and "beneath" a second feature may be that the first feature is right under or obliquely under the second feature, or may simply mean that the first feature is at a lower horizontal level than the second feature.

It should be noted that if an element is referred to as being "fixed to" or "disposed on" another element, the element may be directly on the other element or there may be an intermediate element in between. If an element is referred to as being "connected" to another element, the element may be directly connected to the other element or there may also be an intermediate element in between. The terms "perpendicular", "horizontal", "upper", "lower", "left", "right", and similar descriptions, if present, are used herein for descriptive purposes only and do not necessarily represent the only implementation.

In this disclosure, unless otherwise specified, phrases like "at least one of A, B, and C" and "at least one of A, B, or C" both mean only A, only B, only C, or any combination of A, B, and C.

At present, judging from the trends in the market, the application of power batteries is becoming increasingly widespread. Power batteries are not only applied in energy storage power systems such as hydropower, thermal power, wind power, and solar power stations, but are also widely applied in electric transportation vehicles such as electric bicycles, electric motorcycles, or electric cars, as well as in military equipment, aerospace, and other fields. With the continuous expansion of the application field of power batteries, the market demand for power batteries is also constantly increasing.

In the battery production process, in order to make the products produced meet production requirements, batteries need to be tested. For example, batteries are subjected to charge-discharge tests, voltage acquisition tests, temperature acquisition tests, pressure acquisition tests, or the like. In a test process, structures such as a clamping cylinder, a positive electrode connecting assembly, and a negative electrode connecting assembly are generally used to achieve the automatic connection to a battery. The clamping cylinder is mounted on the negative electrode connecting assembly, a push rod of the clamping cylinder is connected to the positive electrode connecting assembly, and the clamping cylinder separately drives the negative electrode connecting assembly and the positive electrode connecting assembly to move toward the battery, so as to achieve the connection to the battery. However, such a test connecting structure needs structures such as the clamping cylinder, the push rod, the positive electrode connecting assembly and the negative electrode connecting assembly, and a tray-carrying slide, resulting in a complex automatic connection and a low test efficiency. In addition, the battery test cost is also increased.

Based on this, to resolve problems of complex connection and high test cost in the test process, the present application designs a test mechanism, where a limiting member and a conductive member are spaced apart on a base, and a test terminal of a unit under test elastically abuts against the limiting member through the conductive member, so that at this time, an elastic connecting channel can be formed between the limiting member and the conductive member.

When the unit under test needs to be connected for testing, the unit under test may be placed in the channel between the limiting member and the conductive member. At this time, the conductive member elastically abuts against the test terminal of the unit under test, to drive the unit under test to abut against the limiting member for limiting. In this way, the unit under test is stably clamped between the limiting member and the conductive member, so that a good electrical connection can be maintained between the test terminal of the unit under test and the conductive member. As such, the quick and automatic connection of the unit under test is achieved, thereby improving the test efficiency. Meanwhile, compared with a conventional connecting structure, the test mechanism has a simple structure, a low periodic failure rate, and a low maintenance cost, which facilitates reducing the test cost.

According to some embodiments of the present application, referring to FIG. 1, the present application provides a test mechanism 10. The test mechanism 10 includes a base 1, a limiting member 2, and a conductive member 3. The limiting member 2 is disposed on the base 1, the conductive member 3 is disposed on the base 1 and spaced apart from the limiting member 2, and a space between the conductive member 3 and the limiting member 2 is used for placing a unit under test 50. The limiting member 2 is configured to abut against the unit under test 50, and the conductive member 3 is configured to elastically abut against a test terminal 5*c* of the unit under test 50.

The base 1 refers to a structure that can provide support for testing the unit under test 50. When the unit under test 50 is placed between the limiting member 2 and the conductive member 3, the base 1 can support the unit under test 50, so that the unit under test 50 can be stably tested. The unit under test 50 may be a battery 5*a*, with the conductive member 3 directly crimped onto the post terminal or the parameter test terminal 5*c* of the battery 5*a*. Certainly, at this time, for ease of crimping, the battery 5*a* may be placed in a laid-flat manner (for example, a large surface of the battery 5*a* may be placed on the base 1). Alternatively, the unit under test 50 may be a carrier 5*b* on which the battery 5*a* is mounted, so that the battery 5*a* can be electrically connected to the test terminal 5C on the carrier 5*b* in advance. The battery 5*a* is a general term, and may be in the form of a cell of the battery 5*a*, or may be in the form of a module of the battery 5*a* formed by connecting several cells of the battery 5*a* in series, in parallel, or in series-parallel.

The limiting member 2 refers to a structure that can abut against the unit under test 50 supported on the base 1. The limiting member may be connected to the base 1 in various manners; for example, the connection manner may be, but is not limited to, a bolting connection, a snap-fit connection, a riveting connection, a welding connection, a pin connection, or the like.

The conductive member 3 refers to a structure that can apply an elastic abutting force to the unit under test 50 along a side facing the limiting member 2, and is electrically connected to the test terminal 5*c* of the unit under test 50. That is, the conductive member 3 has not only a certain elastic function, but also a certain conductive capability. For example, the conductive member 3 may be made of, but is not limited to, a copper alloy, stainless steel, carbon steel, or the like. When the unit under test 50 is placed between the conductive member 3 and the limiting member 2, the unit under test 50 tightly abuts against the limiting member 2 under the elastic action of the conductive member 3, to achieve stable positioning. In addition, the conductive member 3 may also be designed as a spring structure. For example, the conductive member 3 may include two conductive sheets and a spring connected between the two conductive sheets. The conductive sheet on one side is configured to be electrically connected to an acquisition module, and the conductive sheet on the other side is configured to elastically abut against the test terminal 5*c* of the unit under test 50. It is understandable that to achieve parameter acquisition on the unit under test 50, the conductive member 3 not only needs to abut against the test terminal 5*c* of the unit under test 50, but also needs to be electrically connected to the acquisition module.

Certainly, to enable the unit under test 50 to elastically abut against both the conductive member 3 and the limiting member 2, the distance between the conductive member 3 and the limiting member 2 may be set to be less than or equal to the length of the unit under test 50. In addition, the conductive member 3 can also be connected to the base 1 in various manners, for example, a bolting connection, a snap-fit connection, a riveting connection, a welding connection, or a pin connection.

The test terminal 5*c* of the unit under test 50 refers to an interface that can acquire the operating parameter of the unit under test 50, which may include, but is not limited to, a temperature, a voltage, a pressure, a resistance, or the like. When the operating parameter is the temperature, the temperature information of the unit under test 50 is acquired by elastically abutting the conductive member 3 against the test terminal 5*c* of the unit under test 50. At this time, the conductive member 3 may be electrically connected to a temperature sensor in a battery test system 100. In addition, when the unit under test 50 is the carrier 5*b* on which the battery 5*a* is mounted, a terminal connected to the battery 5*a* may be disposed on the carrier 5*b*. In this way, in the test process, the conductive member 3 can elastically abut against the terminal on the carrier 5*b*, to achieve an indirect electrical conduction between the conductive member 3 and the battery 5*a*.

This design enables a quick and automatic connection of the unit under test 50, thereby improving the test efficiency. Meanwhile, compared with a conventional connecting structure, the test mechanism 10 has a simple structure, a low periodic failure rate, and a low maintenance cost, which facilitates reducing the test cost.

Figure 2:
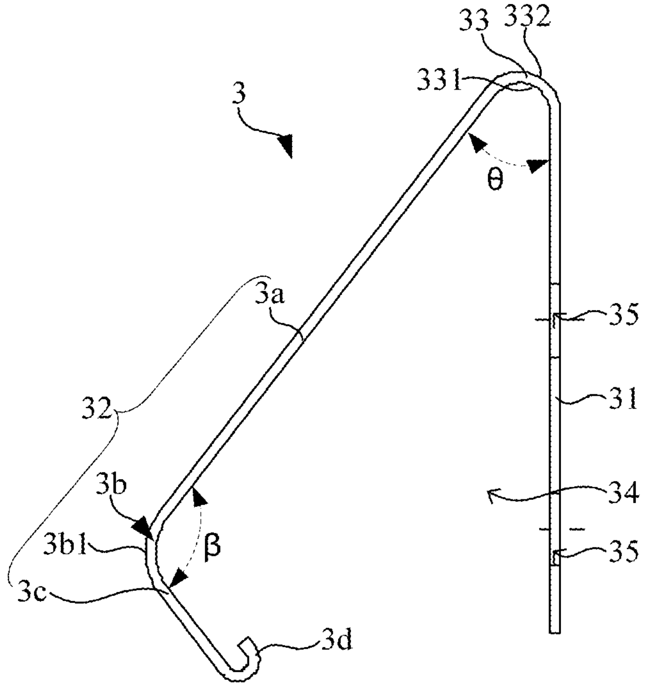
FIG. 2 is a schematic structural diagram of a conductive member in FIG. 1.

According to some embodiments of the present application, referring to FIG. 2, the conductive member 3 includes a first component 31 disposed on the base 1 and a second component 32 configured to abut against the test terminal 5*c* of the unit under test 50. The second component 32 is connected to an end of the first component 31, and a gap 34 that allows relative elastic deformation of the second component and the first component 31 is formed therebetween.

The first component 31 and the second component 32 refer to two structure segments on the conductive member 3, respectively, and the gap 34 that allows for elastic deformation is present between the two components. For example, when the unit under test 50 elastically abuts against the second component 32, the second component 32 deforms toward the first component 31 under the pressure of the unit under test 50, thereby reducing the gap 34 between the two components. After the unit under test 50 is removed from between the conductive member 3 and the limiting member 2, the second component 32 restores its shape due to the release of pressure. At this time, the gap 34 between the first component 31 and the second component 32 becomes larger. In addition, it is understandable that to enable the unit under test 50 placed in to elastically abut against the second component 32, the second component 32 should be located on a side of the first component 31 facing the limiting member 2.

This design enables the second component 32 to better elastically deform relative to the first component 31, so that the test terminal 5*c* of the unit under test 50 tightly abuts against the conductive member 3, thereby improving the reliability of the test connection.

According to some embodiments of the present application, referring to FIG. 2, the first component 31 and the second component 32 are disposed at an included angle, and the included angle between the two components when no elastic deformation occurs is denoted as θ, where 15°≤θ≤45°.

When the first component 31 and the second component 32 are disposed at an included angle, an open end of the included angle between the first component 31 and the second component 32 may be disposed toward the base 1, or may be disposed along a side facing away from the base 1. When the open end of the included angle between the first component 31 and the second component 32 is disposed toward the base 1, that is, an end of the second component 32 distal to the first component 31 extends obliquely along a side facing the base 1 relative to the first component 31, the second component 32 plays a guiding role when the unit under test 50 is placed between the second component 32 and the limiting member 2, guiding the unit under test 50 to smoothly enter between the second component 32 and the limiting member 2.

If the included angle θ is designed to be too small, the gap 34 between the second component 32 and the first component 31 will be too small, thereby reducing the deformable space between the second component 32 and the first component 31 and resulting in a weak elastic strength. In turn, a tight elastic abutment against the test terminal 5*c* of the unit under test 50 cannot be formed. If the included angle θ is designed to be too large, the gap 34 between the second component 32 and the first component 31 will be too large, and the placement space for the battery 5*a* between the conductive member 3 and the limiting member 2 will be occupied too much, reducing the space utilization. To this end, in this embodiment, the included angle θ between the first component 31 and the second component 32 is controlled to be between 15° and 45°; for example, the included angle θ may be, but is not limited to, 15°, 20°, 25°, 30°, 35°, 40°, 45°, or the like. It should be noted that the included angle θ being between 15° and 45° means that the second component 32 is not subjected to the external pressure (such as, compression from the unit under test 50), and maintains an initial state with the first component 31, that is, the second component 32 does not move close to and deform toward the first component 31.

The included angle θ between the first component 31 and the second component 32 is controlled to be between 15° and 45°, so that the conductive member 3 occupies less space in the base 1 for mounting the unit under test 50 under the premise of having sufficient elasticity, thereby effectively taking both the elastic abutting capability and the space utilization into account.

According to some embodiments of the present application, referring to FIG. 2, the included angle θ further satisfies the following condition: 35°≤θ≤40°.

The included angle θ between the first component 31 and the second component 32 may be any value between 35° and 40°; for example, the included angle θ may be, but is not limited to, 35°, 36°, 37°, 38°, 39°, 40°, or the like.

The included angle θ is properly optimized to be between 35° and 40°, so that the conductive member 3 can better elastically abut against the unit under test 50, thereby enabling a more stable connection between the conductive member 3 and the test terminal 5*c* of the unit under test 50, and in turn improving the reliability of the test connection.

According to some embodiments of the present application, referring to FIG. 2, the conductive member 3 further includes a connecting part 33. The second component 32 is connected to the end of the first component 31 through the connecting part 33, and the connecting part 33 is provided in an arching manner in a direction facing away from the gap 34.

The connecting part 33 refers to a structure connected between the first component 31 and the second component 32, and allows the second component 32 to be bent and deformed relative to the first component 31. The connecting part 33 being provided in an arching manner in the direction away from the gap 34 should be understood as: the connecting part 33 is bent and arched as a whole in an arc shape. At this time, the connecting part 33 includes an inner side surface 331 facing the gap 34 and an outer side surface 332 facing away from the gap 34, where the inner side surface 331 is concave in the direction facing away from the gap 34, and the outer side surface 332 is convex in the direction facing away from the gap 34.

The connecting part 33 is provided in an arching manner, such that the first component 31 and the second component 32 are more easily arranged at an included angle, and thus the second component 32 is more elastic than the first component 31. Meanwhile, the connecting part 33 disposed in an arching manner is disposed between the first component 31 and the second component 32, which facilitates reducing stress concentration between the first component 31 and the second component 32.

The connection manner of the connecting part 33 between the first component 31 and the second component 32 may be a combined mounting manner, or may be an integrated forming manner. The combined mounting manner may be, but is not limited to, a welding connection, a bolting connection, a riveting connection, or the like. The integrated forming manner may be, but is not limited to, a bending process, a die-casting process, 3D printing, or the like.

The arched connecting part 33 being disposed between the first component 31 and the second component 32 not only facilitates the arrangement of the first component 31 and the second component 32 at an included angle to improve the elastic function between the two components, but also reduces the stress concentration between the two components to improve the stability of the structure.

In some embodiments of the present application, referring to FIG. 2, the second component 32 includes an extending part 3*a* and a contact part 3*b*. One end of the extending part 3*a* is connected to the first component 31; the other end of the extending part is free to extend, and the gap 34 is formed between the other end of the extending part and the first component 31. The contact part 3*b* is disposed at an end of the extending part 3*a* distal to the first component 31 and is configured to abut against the test terminal 5*c* of the unit under test 50.

The extending part 3*a* refers to a main body structure on the second component 32, which may be considered as a structure extending from the first component 31 in a direction intersecting with the length direction of the first component 31. The extension length of the extending part 3*a* may be determined according to the actual dimension of the unit under test 50 and the position of the test terminal 5*c* of the unit under test 50. Specifically, in some embodiments, the extending part 3*a* is connected to the connecting part 33, and is disposed at an included angle with the first component 31. Meanwhile, an end of the extending part 3*a* distal to the first component 31 extends toward a side of the base 1, and the contact part 3*b* is disposed at an end of the extending part 3*a* proximal to the base 1.

The contact part 3*b* refers to a component in contact with the test terminal 5*c* of the unit under test 50, and can achieve the electrical connection between the conductive member 3 and the unit under test 50. The contact part 3*b* may have various structural designs. For example, the contact part 3*b* may be designed as, but is not limited to, an arc-shaped curved structure, a flat-plate structure, a saw-toothed structure, or the like. In addition, the connection manner of the contact part 3*b* on the extending part 3*a* may also be, but is not limited to, a combined mounting manner such as a welding connection, a bolting connection, or a riveting connection; or may be, but is not limited to, a bending process, a die-casting process, 3D printing, or the like.

The second component 32 being designed to include the extending part 3*a* and the contact part 3*b* enables the extending part 3*a* to bend and deform relative to the first component 31 while the contact part 3*b* is in electrical contact with the test terminal 5*c* of the unit under test 50, thereby enabling a tighter connection between the contact part 3*b* and the test terminal 5*c*.

According to some embodiments of the present application, referring to FIG. 2, the contact part 3*b* is configured as a curved structure. A convex surface 3*b*1 of the contact part 3*b* is provided in a protruding manner along a side facing away from the gap 34.

The contact part 3*b* being configured as the curved structure indicates that the convex surface 3*b*1 of the contact part 3*b* is a curved surface protruding outwards. In this way, the convex surface 3*b*1 of the contact part 3*b* can maintain good contact with the test terminal 5*c* of the unit under test 50 at any angle. Meanwhile, for the units under test 50 of different types or dimensions, the contact part 3*b* can also maintain an electrical connection to the test terminal 5*c* of the unit under test 50, thereby improving the stability of the test connection. Specifically, in some embodiments, the convex surface 3*b*1 of the contact part 3*b* may be an arc curved surface, so that the electrical contact between the contact part 3*b* and the test terminal 5*c* of the unit under test 50 is more stable.

The contact part 3*b* is designed to be curved, so that the convex surface 3*b*1 of the contact part 3*b* can keep good contact with the test terminal 5*c* of the unit under test 50. Meanwhile, for the units under test 50 of different types or dimensions, the contact part 3*b* can also maintain a good electrical connection to the test terminal 5*c* of the unit under test 50, thereby improving the stability of the test connection.

According to some embodiments of the present application, referring to FIG. 2, the second component 32 further includes a scratch-resistant part 3*c*. The scratch-resistant part 3*c* is disposed at an end of the contact part 3*b* distal to the extending part 3*a*, and the scratch-resistant part 3*c* extends along a side facing the first component 31 relative to the extending part 3*a*.

The scratch-resistant part 3*c* refers to a structure that can reduce the probability that the end of the contact part 3*b* distal to the extending part 3*a* scratches the unit under test 50 when the unit under test is removed or placed in. For example, if the end of the second component 32 distal to the first component 31 is disposed in a direction facing away from the base 1, that is, the second component 32 extends obliquely upwards, when the unit under test 50 is placed between the second component 32 and the limiting member 2, the unit under test may be easily hindered by the end of the contact part 3*b*, and thus cannot be placed at a specified position. If the end of the second component 32 distal to the first component 31 is disposed in a direction facing the base 1, that is, the second component 32 extends obliquely downwards, when the unit under test 50 is removed from between the second component 32 and the limiting member 2, the unit under test may also be easily hindered by the end of the contact part 3*b*, and thus cannot be removed.

To this end, the scratch-resistant part 3*c* extending along the side facing the first component 31 being disposed at the end of the contact part 3*b* enables the end of the contact part 3*b* to be provided with an inclined guide structure. In this way, no matter whether the unit under test 50 is removed or placed in, the unit under test will be guided by the scratch-resistant part 3*c*, avoiding the risk of scratches due to the end of the contact part 3*b* directly abutting against the unit under test 50. The scratch-resistant part 3*c* and the extending part 3*a* may be disposed at an angle, or the like.

The inclined scratch-resistant part 3*c* being disposed at the end of the contact part 3*b* distal to the extending part 3*a* enables the end of the contact part 3*b* to be provided with a guide structure, reducing the probability that the unit under test 50 is scratched when the unit under test is removed or placed in, thereby enabling the unit under test 50 to be smoothly removed and placed.

According to some embodiments of the present application, referring to FIG. 2, the scratch-resistant part 3*c* and the extending part 3*a* are disposed at an angle, and the angle between the two is denoted as $\beta$, where $100° \leq \beta \leq 150°$.

The scratch-resistant part 3*c* and the extending part 3*a* being disposed at an angle may be understood as the two bending relative to each other, that is, the extension direction of the scratch-resistant part 3*c* intersects with the extension direction of the extending part 3*a*. The extension length of the scratch-resistant part 3*c* should not be too short or too long. If the extension length is too short, an end of the scratch-resistant part 3*c* distal to the contact part 3*b* is also prone to scratching the unit under test 50. If the extension length is too long, the scratch-resistant part is prone to abutting against the first component 31 or the base 1 when being deformed, thereby reducing the deformation space of the second component 32 relative to the first component 31 and reducing the elasticity of the conductive member 3. The specific extension length of the scratch-resistant part 3*c* may be determined based on actual test conditions.

The magnitude of the angle $\beta$ between the scratch-resistant part 3*c* and the extending part 3*a* affects the scratch-resistant and elastic functions of the conductive member 3. If the angle $\beta$ is too small, which means that the scratch-resistant part 3*c* is bent too much relative to the extending part 3*a*, the portion of the scratch-resistant part 3*c* extending into the gap 34 is too much, so that the scratch-resistant part is prone to abutting against the first component 31 or the base 1, resulting in that the deformation space between the extending part 3*a* and the first component 31 is reduced, and the elastic function of the conductive member 3 is reduced. If the angle $\beta$ is too large, which means that the extension direction of the scratch-resistant part 3*c* is approximately collinear with the extension direction of the extending part 3*a*, an end of the scratch-resistant part 3*c* is also prone to scratching the unit under test 50.

To this end, in this embodiment, the angle β may be any value between 100° and 150°; for example, the angle β may be, but is not limited to, 100°, 110°, 120°, 130°, 140°, 150°, or the like.

This design enables the angle β to be controlled to be between 100° and 150°, so that not only a sufficient deformation space exists between the extending part 3*a* and the first component 31, but also the scratch-resistant part 3*c* can be properly bent into the gap 34, thereby achieving an effective scratch-resistant effect.

According to some embodiments of the present application, the angle β further satisfies the following condition: $100° \leq \beta \leq 110°$.

The angle β may further be a value between 100° and 110°; for example, the angle β may be, but is not limited to, 100°, 102°, 105°, 108°, 110°, or the like.

The angle β is further controlled to be between 100° and 110°, so that the scratch-resistant performance and elastic function of the conductive member 3 can be considered more effectively, thereby making the test of the unit under test 50 more stable and reliable.

According to some embodiments of the present application, referring to FIG. 2, the end of the scratch-resistant part 3*c* distal to the contact part 3*b* is bent in an arcing manner along a side facing the gap 34 to form an arc-shaped part 3*d*.

The arc-shaped part 3*d* refers to a structure formed by bending a side of the scratch-resistant part 3*c* facing the gap 34, which may present a semicircular structure, a "U"-shaped structure, or the like. The arc-shaped part 3*d* bends toward the interior of the gap 34, and the resulting curved structure is not directly exposed, preventing the curved structure from being easily caught by external structures. Meanwhile, an end of the scratch-resistant part 3*c* is bent in an arcing manner, so that the end of the scratch-resistant part 3*c* forms an arc shape. If the impact force generated when the unit under test 50 is placed between the conductive member 3 and the limiting member 2 is relatively large, the end of the scratch-resistant part 3*c* may be impacted and abut against the first component 31 or the base 1. Because the end of the scratch-resistant part 3*c* is in the arc shape, the pressure loss on the first component 31 or the base 1 can be reduced to some extent.

In addition, an end of the arc-shaped part 3*d* distal to the scratch-resistant part 3*c* may be bent to be in contact with the scratch-resistant part 3*c*, or may not be in contact with the scratch-resistant part 3*c*.

The end of the scratch-resistant part 3*c* being bent in an arcing manner to form the arc-shaped part 3*d* enables the impact of the scratch-resistant part 3*c* on the first component 31 or the base 1 to be effectively weakened, the pressure loss to the first component 31 or the base 1 to be reduced, and the stability of the structure of the conductive member 3 to be improved.

According to some embodiments of the present application, referring to FIG. 1, the test mechanism 10 further includes a mounting base 4 disposed on the base 1. The conductive member 3 is disposed on a side surface of the mounting base 4 facing the limiting member 2.

The mounting base 4 refers to a structure for mounting the conductive member 3 on the base 1. The conductive member 3 is disposed on the side surface of the mounting base 4 facing the limiting member 2, facilitating the electrical contact between the conductive member 3 and the test terminal 5*c* on the unit under test 50. The mounting base 4 can be mounted on the base 1 in various manners; for example, the mounting manner may be, but is not limited to, a bolting connection, a snap-fit connection, a riveting connection, a welding connection, a bonding connection, integrated forming, or the like.

The use of the mounting base 4 facilitates the mounting of the conductive member 3 on the base 1, and meanwhile, facilitates the electrical contact between the conductive member 3 and the test terminal 5*c* of the unit under test 50, thereby achieving an automatic test connection.

According to some embodiments of the present application, referring to FIG. 1, at least one of the position of the conductive member 3 on the mounting base 4 and the position of the mounting base 4 on the base 1 is adjustable.

The position of the conductive member 3 on the mounting base 4 may be set to be not adjustable, while the position of the mounting base 4 on the base 1 is adjustable; or, the position of the conductive member 3 on the mounting base 4 is adjustable, while the position of the mounting base 4 on the base 1 is not adjustable; or, the position of the conductive member 3 on the mounting base 4 is adjustable, while the position of the mounting base 4 on the base 1 is adjustable. Specifically, in some embodiments, first mounting holes 41 are formed in the mounting base 4, second mounting holes 35 corresponding to the first mounting holes 41 are formed in the conductive member 3, and fasteners are inserted into the first mounting holes 41 and the second mounting holes 35, so that the conductive member 3 is stably mounted on the mounting base 4. In addition, there are a plurality of first mounting holes 41 and/or second mounting holes 35, and all the first mounting holes 41 or the second mounting holes 35 may be spaced apart in the height direction Z of the test mechanism 10 to adjust the position of the conductive member 3 on the mounting base 4.

The position of the conductive member 3 or the position of the mounting base 4 may be adjusted in various ways. For example, the conductive member 3 or the mounting base 4 may be adjusted in the spacing direction X between the limiting member 2 and the conductive member 3; or the conductive member 3 or the mounting base 4 is adjusted in a preset direction Y; or the conductive member 3 or the mounting base 4 is adjusted in the height direction Z of the test mechanism 10. The height direction Z, the preset direction Y, and the spacing direction X may be mutually perpendicular to each other.

The position of the conductive member 3 or the position of the mounting base 4 being designed to be adjustable enables the conductive member 3 to adapt to the units under test 50 of different models or dimensions, thereby improving the application scope of the test mechanism 10.

Figure 3:
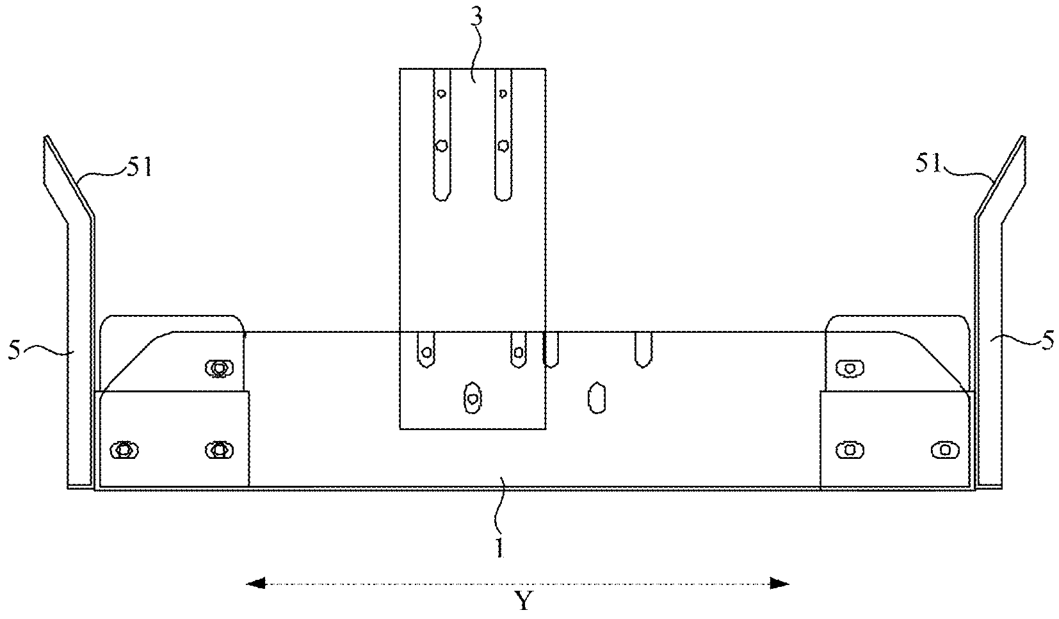
FIG. 3 is a schematic structural diagram of the test mechanism in FIG. 1.

According to some embodiments of the present application, referring to FIG. 3, at least one end of the base 1 in the preset direction Y is provided with a guiding member 5. The guiding member 5 is configured to guide the unit under test 50 onto the base 1, where the spacing direction X between the conductive member 3 and the limiting member 2 intersects with the preset direction Y.

The guiding member 5 refers to a structure capable of guiding the unit under test 50 onto the base 1, which may be designed as an inclined structure, an arc-shaped structure, or the like. The guiding member 5 may be disposed at only an end of the base 1 in the preset direction Y, or may be disposed at two opposite ends of the base 1 in the preset direction Y. When guiding members 5 are disposed at both opposite ends of the base 1 in the preset direction Y, the unit under test 50 can be effectively guided onto the base 1 regardless of any shift of the unit under test in the preset direction Y.

In order to enable the guiding members 5 to be in better contact with the unit under test 50, the guiding members 5 may be extended on the base 1 in the spacing direction X. In addition, the mounting manner of the guiding member 5 on the base 1 may be, but is not limited to, a bolting connection, a snap-fit connection, a riveting connection, a welding connection, a bonding connection, integrated forming, or the like.

The guiding member 5 being disposed on the at least one end of the base 1 in the preset direction Y enables the unit under test 50 to be effectively guided onto the base 1, thereby improving the placement precision of the unit under test 50 on the base 1, and thus improving the reliability of the test.

According to some embodiments of the present application, referring to FIG. 3, an end of the guiding member 5 distal to the base 1 is provided with a guiding surface 51, and the guiding surface 51 is inclined in the preset direction Y and toward a side outside the base 1.

The guiding surface 51 refers to an inclined surface at the end of the guiding member 5 distal to the base 1. The inclined guiding surface 51 being disposed at the end of the guiding member 5 can reduce the occurrence of the unit under test 50 abutting against the end of the guiding member 5 due to misalignment during placement, thereby facilitating the placement of the unit under test 50. When the guiding members 5 are disposed at both ends of the base 1 in the preset direction Y, the guiding surfaces 51 on both sides are inclined in directions facing away from each other to form an inverted "eight" shape.

The guiding surface 51 being disposed on the guiding member 5 facilitates the placement of the unit under test 50 on the base 1; meanwhile, the use of the inclined guiding surface 51 enables the unit under test 50 to be accurately placed on the base 1, thereby improving the placement precision of the unit under test 50.

Figure 4:
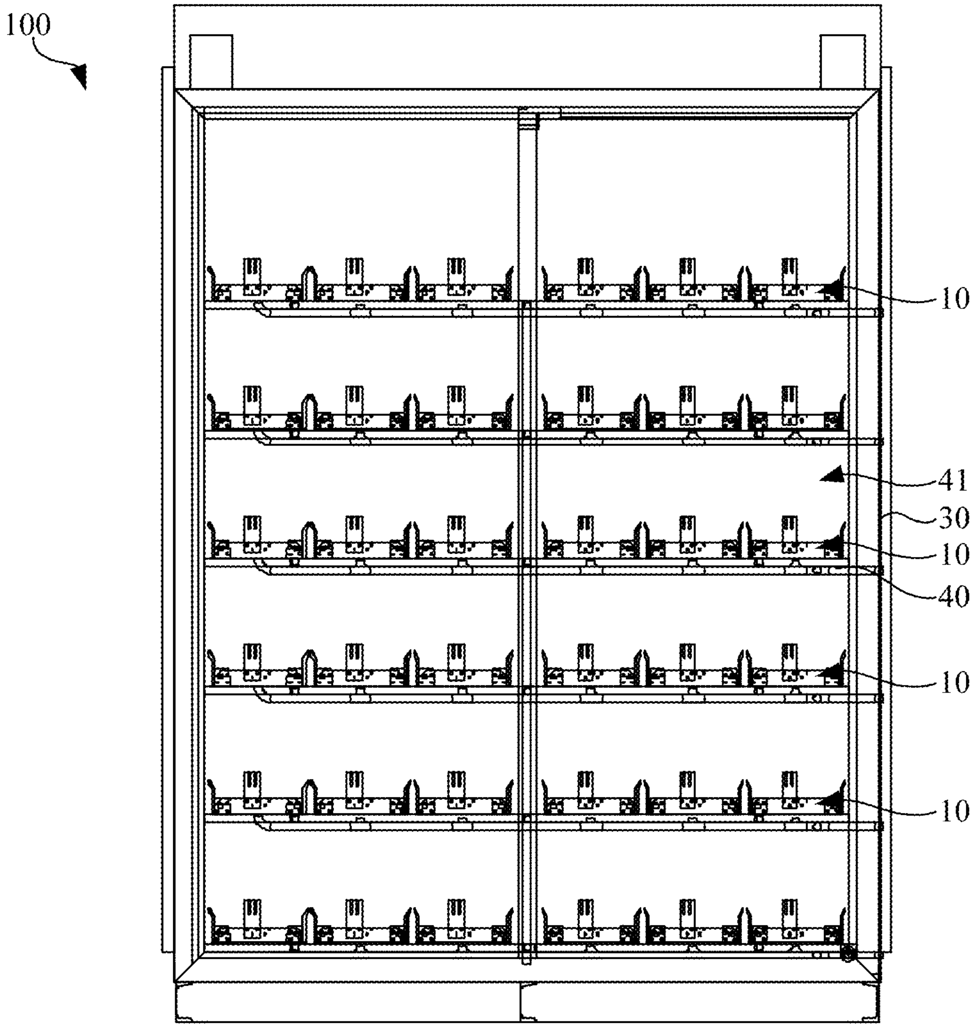
FIG. 4 is a schematic structural diagram of a battery test system according to one or more embodiments.

According to some embodiments of the present application, referring to FIG. 4, the present application provides a battery test system 100. The battery test system 100 includes: an acquisition module 20 and the test mechanism 10 according to any one of the above aspects. The acquisition module 20 is electrically connected to the conductive member 3 to obtain the operating parameter of the unit under test 50.

The acquisition module 20 refers to a device that can obtain the operating parameter of the unit under test 50 through the conductive member 3. For example, the acquisition module may be, but is not limited to, a temperature sensor, a pressure sensor, or the like.

In the battery test system 100 described above, the use of the test mechanism 10 described above enables a quick and automatic connection of the unit under test 50, thereby improving the test efficiency. Meanwhile, compared with a conventional connecting structure, the test mechanism 10 has a simple structure, a low periodic failure rate, and a low maintenance cost, which facilitates reducing the test cost.

According to some embodiments of the present application, referring to FIG. 4, the battery test system 100 further includes a frame 30. The test mechanism 10 and the acquisition module 20 are both disposed in the frame 30.

The frame 30 refers to a structure that supports and accommodates the test mechanism 10 and the acquisition module 20; meanwhile, the frame is a structure that provides a test environment for testing the unit under test 50, which may be designed as a cabinet structure, a case structure, or the like.

The test mechanism 10 and the acquisition module 20 both being integrated in the frame 30 enables a compact structural arrangement of the battery test system 100, reducing the space occupied by the device.

In some embodiments, referring to FIG. 4, the battery test system 100 further includes a separator 40. The separator 40 is disposed in the frame 30 and separates the frame 30 into at least two chambers 41, and at least one test mechanism 10 is disposed in each of the chambers 41.

The separator 40 refers to a structure that can separate the frame 30 into a plurality of spaces, which may transversely separate the interior of the frame 30, vertically separate the interior of the frame 30, or the like. The mounting manner of the separator 40 in the frame 30 may be, but is not limited to, a bolting connection, a snap-fit connection, a riveting connection, a welding connection, or the like.

The separator 40 separating the interior of the frame 30 enables the frame 30 to accommodate a plurality of test mechanisms 10, so that a plurality of units under test 50 can be tested at the same time, thereby improving the test efficiency.

According to some embodiments of the present application, the present application provides a battery production system. The battery production system includes the battery test system 100 according to any one of the above aspects.

According to some embodiments of the present application, the present application provides a test mechanism 10. The test mechanism 10 includes a base 1, a conductive member 3 having an elastic function, and a mounting base 4. The conductive member 3 is fixed on the base 1 through the mounting base 4. When the battery **5*a* is carried on the carrier 5*b* and placed on the base 1, the carrier 5*b* is constrained by the base 1, so that the test terminal 5*c* on the carrier 5*b* is automatically connected to the conductive member 3 (such as, an acquisition elastic sheet), and is connected to the acquisition module 20 via a communication wire to automatically acquire the temperature data of the battery 5*a***.

The technical features of the embodiments described above may be combined in any manner. For brevity, not all possible combinations of the technical features in the above embodiments are described. However, as long as no contradiction exists in the combinations of the technical features, such combinations should be considered to be within the scope of the specification.

The above embodiments represent only several implementations of the present application, and the description thereof is specific and detailed, but should not be understood as limiting the patent scope of the present application. It should be noted that various changes and modifications can be made by those of ordinary skill in the art without departing from the concept of the present application, and these changes and modifications all shall fall within the protection scope of the present application. Therefore, the scope of protection of the patent in the present application shall be subjected to the appended claims.

What is claimed is:

1. A test mechanism, comprising:

a base;

a limiting member disposed on the base; and a conductive member disposed on the base and spaced apart from the limiting member, wherein a space between the conductive member and the limiting member is used for placing a unit under test, the unit under test is placed above the base along a first direction, the limiting member is configured to abut against the unit under test along a second direction, and the conductive member is configured to elastically abut against a test terminal of the unit under test along the second direction, the first direction being perpendicular to the second direction;

wherein the conductive member comprises a first component disposed on the base and a second component configured to abut against the test terminal of the unit under test, the second component being connected to an end of the first component, and a gap that allows relative elastic deformation of the second component and the first component being formed therebetween.

2. The test mechanism according to claim 1, wherein the first component and the second component are disposed at an included angle, and the included angle θ between the two components when no elastic deformation occurs satisfies $15°\le\theta\le45°$.

3. The test mechanism according to claim 2, wherein the included angle θ further satisfies the following condition: $35°\le\theta\le40°$.

4. The test mechanism according to claim 1, wherein the conductive member further comprises a connecting part, wherein the second component is connected to the end of the first component through the connecting part, and the connecting part is provided in an arching manner in a direction facing away from the gap.

5. The test mechanism according to claim 1, wherein the second component comprises an extending part and a contact part, wherein one end of the extending part is connected to the first component, the other end of the extending part is free to extend, and the gap is formed between the other end of the extending part and the first component; and the contact part is disposed at an end of the extending part distal to the first component and configured to abut against the test terminal of the unit under test.

6. The test mechanism according to claim 5, wherein the contact part is configured as an arc-shaped curved structure, and a convex surface of the contact part is provided in a protruding manner along a side facing away from the gap.

7. The test mechanism according to claim 5, wherein the second component further comprises a scratch-resistant part, wherein the scratch-resistant part is disposed at an end of the contact part distal to the extending part, and the scratch-resistant part extends along a side facing the first component relative to the extending part.

8. The test mechanism according to claim 7, wherein the scratch-resistant part and the extending part are disposed at an angle, and the angle β between the two satisfies $100°\le\beta\le150°$.

9. The test mechanism according to claim 8, wherein the angle β further satisfies the following condition: $100°\le\beta\le110°$.

10. The test mechanism according to claim 7, wherein an end of the scratch-resistant part distal to the contact part is bent in an arcing manner along a side facing the gap to form an arc-shaped part.

11. The test mechanism according to claim 1, further comprising:

a mounting base disposed on the base, the conductive member being disposed on a side surface of the mounting base facing the limiting member.

12. The test mechanism according to claim 11, wherein at least one of a position of the conductive member on the mounting base and a position of the mounting base on the base is adjustable.

13. The test mechanism according to claim 1, wherein at least one end of the base in a preset direction is provided with a guiding member, the guiding member being configured to guide the unit under test onto the base, wherein a spacing direction between the conductive member and the limiting member intersects with the preset direction.

14. The test mechanism according to claim 13, wherein an end of the guiding member distal to the base is provided with a guiding surface, the guiding surface being inclined in the preset direction and toward a side outside the base.

15. A battery test system, comprising:

the test mechanism according to claim 1; and an acquisition module electrically connected to the conductive member to obtain an operating parameter of the unit under test.

16. The battery test system according to claim 15, further comprising:

a frame, the test mechanism and the acquisition module both being disposed in the frame.

17. The battery test system according to claim 16, further comprising:

a separator, the separator being disposed in the frame and separating the frame into at least two chambers, and at least one test mechanism being disposed in each of the chambers.

18. A battery production system, comprising the battery test system according to claim 15.

19. A test mechanism, comprising:

a base;

a limiting member disposed on the base; and a conductive member disposed on the base and spaced apart from the limiting member, wherein a space between the conductive member and the limiting member is used for placing a unit under test, the limiting member is configured to abut against the unit under test, and the conductive member is configured to elastically abut against a test terminal of the unit under test;

wherein the conductive member comprises a first component disposed on the base and a second component configured to abut against the test terminal of the unit under test, the second component being connected to an end of the first component, and a gap that allows relative elastic deformation of the second component and the first component being formed therebetween.

* * * * *